UNITED STATES PATENT OFFICE 1,950,876

THIAZOLINE DYE AND METHOD OF PREPARING IT

Leslie G. S. Brooker, Rochester, N. Y., assignor to Eastman Kodak Company, Rochester, N. Y., a corporation of New York No Drawing. Application June 24, 1931, Serial No. 546,663

19 Claims. (Cl. 260—44)

This invention relates to new dyes of the thiazoline type which are particularly useful for sensitizing photographic emulsions and to methods of preparing those dyes. This application is a continuation-in-part of my application Serial No. 460,548, filed June 11, 1930, matured into Patent No. 1,942,854.

An object of the present invention is to provide a process for the preparation of photo-sensitizing dyes containing the thiazoline nucleus. Another object of this invention is to provide such photo-sensitizing dyes as may be added to photographic emulsions or coated thereon as an overcoating whereby the sensitivity of the photographic emulsion is increased. Other objects will hereinafter appear.

I have found that the base 2-methylthiazoline gives rise to several different series of cyanine dyes, many of which are excellent sensitizers for photographic emulsions.

The base itself has the structure

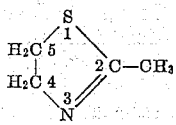

and is usually numbered as shown in the structural formula. The carbon atom numbered 2 is also called the μ carbon atom (Hantzsch, Annalen, 1888, 249, 3) from the initial letter of the words Mittel or Meso, but herein the numbering as shown above will be used exclusively.

2-methylthiazoline readily forms alkyl quaternary salts such as the methiodide, ethiodide, alliodide, metho-p-toluenesulfonate, etc., and these compounds undergo condensation with quinoline alkyl quaternary salts to give rise to dyes for which the name thiazolino-iso-cyanine is proposed, by analogy with the somewhat similar constituted thio-iso-cyanines, such as disclosed in my application Serial No. 435,105, filed March 12, 1930. These new dyes may be represented by the general formula

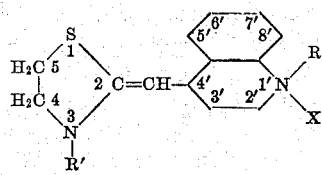

where $R'$ and $R^2$ represent alkyl groups and X an acidic radical. The dye molecule is numbered as shown in the figure so that the general name for a compound of this type is 1'-alkyl-3-alkyl-thiazolino-iso-cyanine salt.

The 2-methylthiazoline alkyl quaternary salts also undergo condensation with 2-iodoquinoline alkyl quaternary salts to give dyes which from their method of preparation and analytical results are doubtless of the general formula

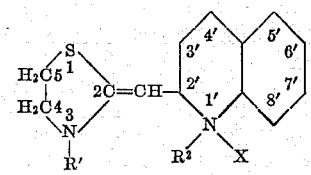

For these the general name thiazolino-pseudo-cyanine or thiazolino-ψ-cyanine is proposed and, using the system of numbering shown in the figure, the general name for individual members of this class will be 1'-alkyl-3-alkylthiazolino-ψ-cyanine salt.

The 2-methylthiazoline alkyl quaternary salts also undergo condensation upon themselves to give rise to products for which the name thiazolinocarbocyanine is proposed, and which are probably represented by the following formula by analogy with the somewhat similarly constituted bases 1-methylbenzothiazole, quinaldine, 2-methyl-β-naphthothiazole, etc.,

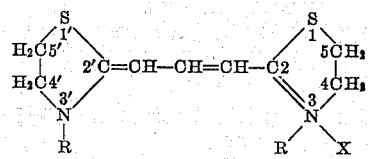

Since this type of dye is, in general, produced by the condensation of two similar molecules, the alkyl groups will be the same, and the general name is 3:3'-dialkylthiazolinocarbocyanine salt. This dye is obtained when ethyl ortho formate is employed in the condensation.

Thiazolinocarbocyanines substituted in the three-carbon chain may also be prepared. These are of the general type

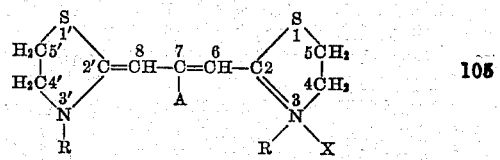

where A stands for the substituent group. This type of compound is obtained when a tri alkyl ester of an ortho carboxylic acid other than orthoformic ester is employed in the condensation. For instance trimethyl orthoacetate yields 7-methyl-3:3'-dialkyl thiazolino carbocyanine salt while trimethyl orthopropionate yields a 7-ethyl-3:3' dialkyl thiazolinocarbo cyanine salt. This 7-alkyl group may itself be unsubstituted or substituted according to the nature of the tri alkyl ortho carboxylic acid ester employed. Using tri alkyl esters of aromatic carboxylic acids, 2:2'-dialkyl-7-arylthiazolinocarbocyanines are obtained. This 7-aryl group may be unsubstituted or substituted likewise, according to the nature of the tri alkyl ortho carboxylic acid ester employed.

Lastly, sensitizing dyes are produced by the condensation of 2-methylthiazoline alkyl quaternary salts with dialkylaminobenzaldehydes such as p-dimethylaminobenzaldehyde, giving rise to products of the type

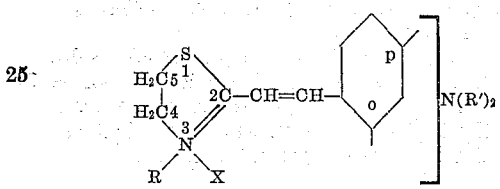

R, R' and X having the significance heretofore given to them.

The nomenclature and numbering of the above classes of compounds and intermediates are in accord with present usage and also the system used in my co-pending applications of Serial Numbers 437,017 filed March 19, 1930, and 435,104 filed March 12, 1930, matured into Patents Nos. 1,861,836 and 1,846,301, respectively. The numbering of the thiazoline nucleus already given is preserved when that nucleus forms part of a cyanine dye molecule. The numbering, of course, is arbitrary and is given for the guidance of those skilled in organic chemistry in order that there be no question as to the identity of the compounds covered by my invention.

I will now give several examples for preparing members of each of the classes of dyes above referred to but it will be understood that they are merely representative of a great number of methods in which the proportions given and equivalents used may vary in accord with the particular type of dye required. My invention, therefore, will not be restricted thereby except as indicated in the appended claims.

*Preparation of 2-methyl thiazoline alkyl quaternary salts*

2-methylthiazoline methiodide was made by heating 30.3 g. (1 mol.) of 2-methylthiazoline under reflux with 44.7 g. (1 mol.+5% excess) of methyl iodide, the latter being added in portions. The initial reaction was rapid but the heating was continued overnight on the steam bath. The product was crystallized from a mixture of acetone and methyl alcohol and colorless crystals were obtained. A first crop weighed 49.3 g. and on concentrating the mother liquors a second crop of 6.6 g. was obtained.

2-methylthiazoline ethiodide was made similarly, the base (30.3 g., 1 mol.) being refluxed with ethyl iodide (49.1 g., 1 mol.+5% excess) overnight. The crude product was obtained as colorless needles on recrystallization from a mixture of acetone and methyl alcohol, and a first crop weighed 37 g. and a second crop, obtained by concentrating the mother liquors, 11.8 g.

*2-methyl thiazoline alliodide*

Equimolecular proportions of 2-methylthiazoline and allyl iodide were heated together under a reflux condenser for half an hour. Oily drops were formed at first and gradually increased in bulk until the whole was a brown viscous mass. In Example 5 this crude product was used without further purification.

*2-methylthiazoline metho-p. toluene sulfonate*

Approximately equimolecular proportions of 2-methylthiazoline and methyl p. toluene sulfonate were heated together for about an hour in an oil bath at 110–120°. (Sometimes a slight excess of the methyl p. toluene sulfonate was employed.) The quaternary salt solidified to a yellowish mass and was used without further purification.

*2-methylthiazoline etho-p. toluene sulfonate*

Approximately equimolecular proportions of 2-methythiazoline and ethyl p. toluene sulfonate were heated together overnight or for a longer period in an oil bath at about 100–110°. This crude quaternary salt was likewise used without further purification.

THIAZOLINO-ISO-CYANINES

*Example 1*

*1':3-dimethylthiazolino-iso-cyanine iodide.*—4.9 g. (1 mol.) of 2-methylthiazoline methiodide and 5.4 g. (1 mol.) of quinaline methiodide were dissolved in 25 cc. boiling absolute ethyl alcohol and 1.3 g. (1 mol.) of 85% solid caustic potash, dissolved in 10 cc. boiling absolute ethyl alcohol, added during five minutes with shaking. The vessel in which the caustic potash had been dissolved was rinsed out with 5 cc. more solvent. The solution darkened and became yellowish-orange and potassium iodide separated. Refluxing was continued for 15 minutes and the solution was allowed to cool, and was finally filtered. The residue was washed with a little cold water to remove inorganic salts and followed by cold acetone. The product was a light yellowish-brown crystalline powder and weighed 1.1 g.

An increased yield of dye, based on the starting weight of the 2-methylthiazoline methiodide, was obtained by using the following proportions.

4.9 g. (1 mol.) 2-methylthiazoline methiodide was dissolved in 50 cc. absolute ethyl alcohol together with 10.9 g. (2 mols.) of quinoline methiodide and 2.6 g. (2 mols.) of approximately 85% solid caustic potash dissolved in 25 cc. of hot absolute ethyl alcohol added in portions over 5 minutes. After boiling for 15 minutes longer, the solution, which had turned an orange color and from which much solid had separated, was stood to one side to cool. The residue on filtration was washed as in the preceding experiment when a brownish powder was left which, when dried, weighed 3.1 g. On crystallizing from methyl alcohol, orange-yellow needles were obtained which gave a yellow solution in methyl alcohol.

*Example 2*

*3-methyl-1'-ethylthiazolino-iso-cyanine iodide.*—2.4 g. (1 mol.) 2-methylthiazoline methiodide was dissolved in 15 cc. boiling absolute ethyl alcohol together with 5.7 g. (2 mols.) quinoline ethiodide, and the condensation effected by using 1 g. (1.5 mols.) of approximately 85% solid caustic potash dissolved in 10 cc. of the same solvent and added over five minutes, boiling being continued for ten minutes more. The product obtained by filtering the cooled solution was washed with cold water and then with acetone, and on drying weighed 1.4 g.

An improved yield (1.6 g) was obtained when 1.3 g. (2 mols.) of the caustic potash was employed in place of the 1 g. (1.5 mols.) used in the foregoing experiment.

On recrystallizing the dye from methyl alcohol, light brown needles were obtained which gave a yellow solution in that solvent.

*Example 3*

1':3-diethylthiazolino-iso-cyanine iodide.—2.6 g. (1 mol.) 2-methylthiazoline ethiodide was condensed with quinoline ethiodide, taking 5.7 g. (2 mols.) of the latter and using 1.3 g. (2 mols.) of the 85% solid caustic potash. From one experiment 2.1 g. of the unrecrystallized product was obtained as a purplish-brown powder which crystallized from methyl alcohol in reddish-brown crystals. This dye too gave a yellow solution in methyl alcohol.

*Example 4*

1'-methyl-3-ethylthiazolino-iso-cyanine iodide.—2.6 g. (1 mol.) 2-methylthiazoline ethiodide and 5.4 g. (2 mols.) quinoline methiodide were condensed in 15 cc. boiling absolute ethyl alcohol, using 1.3 g. (2 mols.) 85% solid caustic potash dissolved in 10 cc. boiling absolute ethyl alcohol and rinsed out with a further 5 cc. The whole was refluxed for seven minutes and allowed to crystallize, and then filtered and washed as in the foregoing experiments. 1.8 g. of dye remained as a brown crystalline powder. When crystallized from methyl alcohol, brown crystals reflecting green and blue light were obtained, which gave a yellow solution.

*Example 5*

1':3-diallylthiazolino-iso-cyanine iodide.—2 g. (1 mol.) 2-methylthiazoline was heated with 3.4 g. (1 mol.) allyl iodide on a steam bath under a reflux condenser for half an hour. Oily drops were formed at first and gradually increased in bulk until the whole was a brown viscous mass. This crude product was used without further purification. 20 cc. of absolute ethyl alcohol were added, followed by 11.9 g. (2 mols.) of quinoline alliodide, and the boiling solution treated with 2.7 g. (2 mols.) of the 85% solid caustic potash dissolved in a further 20 cc. of boiling absolute ethyl alcohol. The whole was boiled for ten minutes and allowed to cool over night and the dye isolated as in the foregoing experiments. 1.2 g. of dye was obtained as brown aggregates of crystals which gave brownish crystals on crystallization from methyl alcohol, in which they gave a yellow solution.

*Example 6*

1':3:6'-trimethyl thiazolino-iso-cyanine iodide.—2.5 g. (1 mol.) 2-methylthiazoline methiodide treated with 5.7 g. (2 mols.) 6-methylquinoline methiodide, and 1.3 g. (2 mols.) of 85% solid caustic potash gave 1.8 g. of crude dye which crystallized from methyl alcohol in yellow needles, and which gave a yellow solution in that solvent.

*Example 7*

1':3:8'-trimethylthiazolino-iso-cyanine iodide.—2.5 g. (1 mol.) 2-methylthiazoline methiodide treated with 5.7 g. (2 mols.) of 8-methylquinoline methiodide in the presence of 1.3 g. (2 mols.) of 85% solid caustic potash, using absolute ethyl alcohol as a solvent, gave 0.29 g. of dye which gave light brown needles on twice recrystallizing from acetone.

*Thiazolino-ψ-cyanines*

These compounds were made by condensing a 2-methylthiazoline alkyl quaternary salt with a 2-iodoquinoline alkyl quaternary salt, using absolute ethyl alcohol as a solvent and caustic potash as the condensing agent.

*Example 8*

1':3-dimethylthiazolino-ψ-cyanine iodide.—2.5 g. (1 mol.) of 2-methylthiazoline methiodide was dissolved in 25 cc. boiling absolute ethyl alcohol in which 4 g. (1 mol.) of finely pulverized 2-iodoquinoline methiodide was suspended. 1.4 g. (2 mols.) of approximately 85% solid caustic potash was dissolved in 10 cc. of the same solvent, boiled, and this solution gradually added to the hot suspension with vigorous shaking. A considerable amount of heat was evolved and the solution darkened in color through yellow to orange, while much potassium iodide separated. Boiling under reflux was continued over ten minutes and the whole was allowed to cool overnight. It was then filtered, washed with a little cold acetone, followed by cold water and then by a little cold acetone again, when the dye was obtained as an orange powder which weighed 2.4 g. when dry. It gave a yellow solution in methyl alcohol, from which solvent it crystallized in orange needles.

*Example 9*

3-methyl-1'-ethylthiazolino-ψ-cyanine iodide—4.9 g. (1 mol.) 2-methylthiazoline methiodide condensed with 8.2 g. (1 mol.) 2-iodoquinoline ethiodide, using 2.7 g. (2 mols.) of approximately 85% solid caustic potash, gave, on similar treatment to the above, 4.6 g. of the dye as an orange crystalline powder. It crystallized from methyl alcohol in lustrous orange crystals which gave a yellow solution in that solvent.

*Example 10*

1':3-diethylthiazolino-ψ-cyanine iodide.—2.6 g. (1 mol.) 2-methylthiazoline ethiodide, condensed with 4.1 g. (1 mol.) 2-iodoquinoline ethiodide, using 1.4 g. (2 mols.) of the grade of caustic potash used throughout, furnished 2.4 g. of the dry dye. This was recrystallized twice from methyl alcohol, which treatment removed a red impurity, and the pure dye was obtained in yellowish-orange crystals which gave a yellow solution in the solvent.

*Example 11*

1'-methyl-3-ethylthiazolino-ψ-cyanine iodide.—2.6 g. (1 mol.) 2-methylthiazoline ethiodide was condensed with 4.0 g. (1 mol.) 2-iodoquinoline methiodide, using 1.4 g. (2 mols.) of caustic potash. 2.7 g. of the dry dye was obtained which gave a yellow solution in methyl alcohol, from which it was recrystallized and obtained in the form of an orange crystalline powder.

THIAZOLINOCARBOCYANINES

*Example 12*

3:3'-dimethylthiazolinocarbocyanine iodide.—3 g. (1 mol.) 2-methylthiazoline was heated for one hour in an oil bath at 110–120° with 5.6 g.

(1 mol.) methyl p-toluenesulfonate. The quaternary salt solidified to a yellowish mass and was used without further purification. It was dissolved in 15 cc. of boiling pyridine and refluxed for five hours with 8.9 g. (2 mols.) ethyl orthoformate. The solution rapidly became orange colored. It was treated with a large excess of potassium iodide (40 g.), dissolved in 100 cc. of hot water, and stood aside to crystallize. The solution was filtered and the residue washed with water followed by acetone, and dried. 2.1 g. of a light brown crystalline powder was obtained which gave a pure yellow solution in methyl alcohol, from which it crystallized in the form of light brown crystals.

*Example 13*

3:3'-diethylthiazolinocarbocyanine iodide.—3 g. (1 mol.) 2-methylthiazoline was heated over night with 6 g. (1 mol.) ethyl p-toluenesulfonate at 100–110°. The quaternary salt was used without further purification. It was refluxed for 4.5 hours with 8.9 g. (2 mols.) of ethyl orthoformate, using 12 cc. dry pyridine as a solvent, and was then treated with excess (15 g.) of potassium iodide dissolved in 50 cc. of hot water, and allowed to stand over night. It was necessary to chill and stir the solution in order to induce crystallization, and then the crystals were filtered off, washed with water followed by acetone, and dried. Weight 3.1 g. of an orange crystalline powder. On crystallizing from methyl alcohol in which the dye gave a yellow solution, orange-brown needles were obtained showing a blue reflex.

*Example 14*

3:3':7-trimethyl thiazolino carbocyanine iodide.—4 g. (1 mol.) 2-methyl thiazoline was heated with 7.6 g. (slightly more than 1 mol.) of methyl p. toluene sulfonate for 1½ hours at 110°. The quaternary salt solidified and was used without further purification, being refluxed for four hours with 20 cc. dry pyridine and 9.6 g. (2 mols.) trimethyl ortho acetate.

At the end of this time a solution of 20 g. potassium iodide in 60 cc. of hot water was added and the whole placed in a freezing mixture and crystallization, which was somewhat difficult to induce, promoted by stirring with a glass rod. When no more dye appeared to separate the whole was quickly filtered and washed with a little cold water followed by a little cold acetone. The dye was obtained as an orange colored crystalline powder weighing 1.4 g. when dry and could be recrystallized from methyl alcohol in which solvent it gave a yellow solution.

*Example 15*

3:3'-dimethyl-7-ethyl thiazolino carbocyanine iodide.—A similar amount of 2-methyl thiazoline metho p. toluene sulfonate, prepared as Example 14 was refluxed for 4½ hours with 20 cc. dry pyridine and 10.8 g. (2 mols.) trimethyl ortho propionate. The reaction mixture was then treated with a hot solution of 20 g. potassium iodide in 60 cc. of water and allowed to crystallize out overnight by standing in the refrigerator. In the morning a further crop of crystals was obtained by stirring the liquid, while freezing well in an ice-salt mixture. The dye was filtered off, washed with distilled water followed by acetone and dried. The larger crystals consisted of reddish brown needles possessing a blue reflex, the remainder appeared as an orange powder, wt. 2.9 g. The dye was recrystallized from methyl alcohol and gave a yellow solution in that solvent.

*Example 16*

3:3':7-triethyl thiazolino carbocyanine iodide.—3. g. (1 mol.) 2-methyl thiazoline was condensed overnight with 6.3 g. (rather more than 1 mol.) of ethyl p. toluene sulfonate. The crude quaternary salt was then refluxed for 3¼ hours with 10 cc. dry pyridine and 8.1 g. (2 mols.) trimethyl ortho propionate. The reaction mixture was treated with a solution of 10 g. potassium iodide in 50 cc. water and on standing in the refrigerator for several days crystals slowly separated. Finally the whole was well chilled with occasional stirring for several hours in an ice-salt mixture and filtered and washed with a little cold water followed by a little cold acetone. The dye formed an orange crystalline powder and weighed 1.2 g. A further 0.5 g. was obtained by evaporating down the mother liquor in vacuo and washing out the inorganic salt from the residue with a little water and then the organic impurities with ether followed by acetone. The dye was crystallized from a mixture of methyl alcohol and acetone and gave an orange crystalline powder. The solution was yellow.

*Styrylthiazoline compounds*

2-p. dimethylaminostyrylthiazoline methiodide.—4.9 g. (1 mol.) 2-methylthiazoline methiodide was boiled for 16 hours under reflux with 3 g. (1 mol.) p-dimethylaminobenzaldehyde using 20 cc. methyl alcohol as a solvent and a few drops of piperidine as a catalyst. The whole set to a mass of crystals on transferring to a beaker and stirring, and on cooling it was filtered and washed with acetone. When dry it weighed 4.4 g. It crystallized from methyl alcohol in the form of pinkish-brown needles and in this solvent it gave a yellow-orange solution.

2-p. dimethylaminostyrylthiazoline ethiodide.—5.2 g. (1 mol.) 2-methylthiazoline ethiodide was condensed in 15 cc. boiling methyl alcohol with 3.0 g. (1 mol.) p-dimethylaminobenzaldehyde by refluxing for about 16 hours and using a few drops of piperidine as a catalyst. Most of the methyl alcohol was evaporated off and the residue was stirred with ether when it solidified. It was filtered off and crystallized from a mixture of methyl alcohol and acetone, when 4.0 g. of a felted mass of orange needles was obtained. The dye gave a yellow-orange solution in methyl alcohol.

By substituting various similar or dissimilar alkyl groups in the positions in the structural formulæ occupied by the letters R, R' and R$^2$ many sensitizing dyes may be obtained. The letter X indicates any suitable acid radical such, for example, as the halides, p-toluene sulfonate, alkylo sulfate or in fact any suitable acid radical which will not greatly decrease or destroy the sensitizing properties of the dye, this radical being necessary to give electrical neutrality to the molecule. In the claims the phrase—"a suitable acid radical"—is employed to designate this group of acid radicals.

It is apparent from a thorough consideration of the above description that any cyanine dye prepared from the base 2-methylthiazoline will come within the scope of this invention whatever may be the radicals indicated in the various structural formulæ by the letters R, R', R$^2$ and X, or for that matter any similar cyanine dye derived from a 2-methylthiazoline substituted in one or both of the positions (numbered 4 and 5 in the formula given) available for substitution.

What I claim as my invention and desire to secure by Letters Patent of the United States is:

1. A carbocyanine dye of the following structure

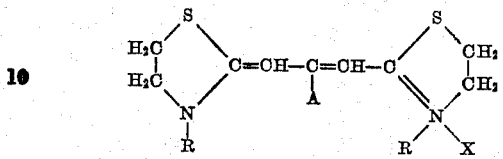

in which R equals alkyl, X equals an acid radical and A equals hydrogen, or an alkyl group, or an aryl group of the benzene series.

2. A carbocyanine dye of the following structure

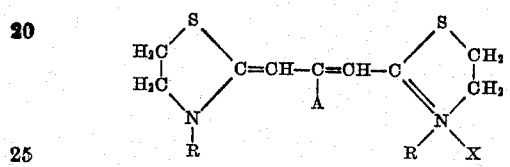

in which R equals alkyl, X equals an acid radical and A equals an alkyl group.

3. A carbocyanine dye of the following structure

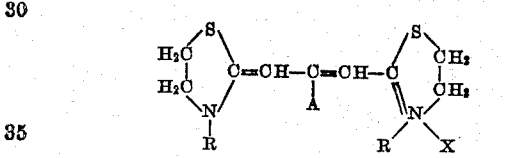

in which R equals alkyl, X equals an acid radical and A equals an aryl group of the benzene series.

4. A 3:3'-dialkylthiazolinocarbocyanine salt.
5. A 3:3'-dialkylthiazolinocarbocyanine iodide.
6. A 3:3'-dimethylthiazolinocarbocyanine iodide.
7. A 3:3'-diethylthiazolinocarbocyanine iodide.
8. A 3:3':7-trialkylthiazolinocarbocyanine salt.
9. A 3:3':7-trimethylthiazolinocarbocyanine iodide.
10. A 3:3'-dimethyl-7-ethylthiazolinocarbocyanine iodide.
11. A 3:3':7-triethylthiazolinocarbocyanine iodide.
12. A process for the preparation of thiazolinocarbocyanine salts which comprises condensing, under the influence of heat, two molecular proportions of a 2-methyl thiazoline alkyl quaternary salt with one molecular proportion of an ortho ester of a monobasic carboxylic acid in the presence of an organic base which is a solvent for the reactants and which acts to bind acid eliminated from the quaternary salt as a result of the condensation.

13. A process for the preparation of thiazolinocarbocyanine salts which comprises condensing, under the influence of heat, two molecular proportions of a 2-methyl thiazoline alkyl quaternary salt with one molecular proportion of an ortho ester of an aliphatic carboxylic acid in the presence of an organic base which is a solvent for the reactants and which acts to bind acid eliminated from the quaternary salt as a result of the condensation.

14. A process for the preparation of thiazolinocarbocyanine salts which comprises condensing, under the influence of heat, two molecular proportions of a 2-methyl thiazoline alkyl quaternary salt with one molecular proportion of ethyl ortho formate in the presence of an organic base which is a solvent for the reactants and which acts to bind acid eliminated from the quaternary salt as a result of the condensation.

15. A process for the preparation of thiazolinocarbocyanine salts which comprises condensing, under the influence of heat, two molecular proportions of a 2-methyl thiazoline alkyl quaternary salt with one molecular proportion of methyl ortho acetate in the presence of an organic base which is a solvent for the reactants and which acts to bind acid eliminated from the quaternary salt as a result of the condensation.

16. A process for the preparation of thiazolinocarbocyanine salts which comprises condensing, under the influence of heat, two molecular proportions of a 2-methyl thiazoline alkyl quaternary salt with one molecular proportion of methyl ortho propionate in the presence of an organic base which is a solvent for the reactants and which acts to bind acid eliminated from the quaternary salt as a result of the condensation.

17. A process for the preparation of thiazolinocarbocyanine salts which comprises condensing, under the influence of heat, two molecular proportions of a 2-methyl thiazoline alkyl quaternary salt with one molecular proportion of ethyl ortho formate in the presence of pyridine.

18. A process for the preparation of thiazolinocarbocyanine salts which comprises condensing, under the influence of heat, two molecular proportions of a 2-methyl thiazoline alkyl quaternary salt with one molecular proportion of methyl ortho acetate in the presence of pyridine.

19. A process for the preparation of thiazolinocarbocyanine salts which comprises condensing, under the influence of heat, two molecular proportions of a 2-methyl thiazoline alkyl quaternary salt with one molecular proportion of methyl ortho propionate in the presence of pyridine.

LESLIE G. S. BROOKER.